(12) United States Patent
Shiraishi et al.

(10) Patent No.: US 9,860,086 B1
(45) Date of Patent: Jan. 2, 2018

(54) EQUALIZER CIRCUIT AND OPTICAL MODULE

(71) Applicant: FUJITSU LIMITED, Kawasaki-shi, Kanagawa (JP)

(72) Inventors: Takashi Shiraishi, Atsugi (JP); Yukito Tsunoda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/461,883

(22) Filed: Mar. 17, 2017

(30) Foreign Application Priority Data

Jun. 8, 2016 (JP) ................................. 2016-114561

(51) Int. Cl.
*H04L 25/03* (2006.01)
*H04B 10/40* (2013.01)
*H04B 3/14* (2006.01)

(52) U.S. Cl.
CPC ....... *H04L 25/03019* (2013.01); *H04B 3/145* (2013.01); *H04B 10/40* (2013.01)

(58) Field of Classification Search
CPC .... H04L 25/03019; H04B 3/145; H04B 10/40
See application file for complete search history.

(56) References Cited

U.S. PATENT DOCUMENTS

| 5,521,555 | A | * | 5/1996 | Tazartes | .................... | G01J 1/44 250/214 A |
| 5,530,769 | A | * | 6/1996 | Saitoh | .................... | H03G 5/025 333/28 T |
| 5,708,391 | A | * | 1/1998 | Altmann | ............ | H03H 11/1213 330/252 |
| 6,531,931 | B1 | * | 3/2003 | Benyamin | .............. | H04B 3/145 330/304 |
| 8,138,851 | B2 | * | 3/2012 | Lutz | ....................... | H04B 3/145 333/81 R |

FOREIGN PATENT DOCUMENTS

| EP | 1033811 | 9/2000 |
| JP | 2000-299619 | 10/2000 |
| JP | 2009-171406 | 7/2009 |

\* cited by examiner

*Primary Examiner* — Freshteh N Aghdam
(74) *Attorney, Agent, or Firm* — Fujitsu Patent Center

(57) ABSTRACT

An equalizer circuit includes: a pair of input terminals: a differential amplification circuit outputs, to a pair of output terminals, first signals obtained by amplifying a difference in levels of input signals supplied to the pair of input terminals; and a differential differentiation amplification circuit that outputs, to the pair of output terminals, second signals obtained by amplifying a time-varying change in the difference in the levels of the input signals supplied to the pair of input terminals.

18 Claims, 20 Drawing Sheets

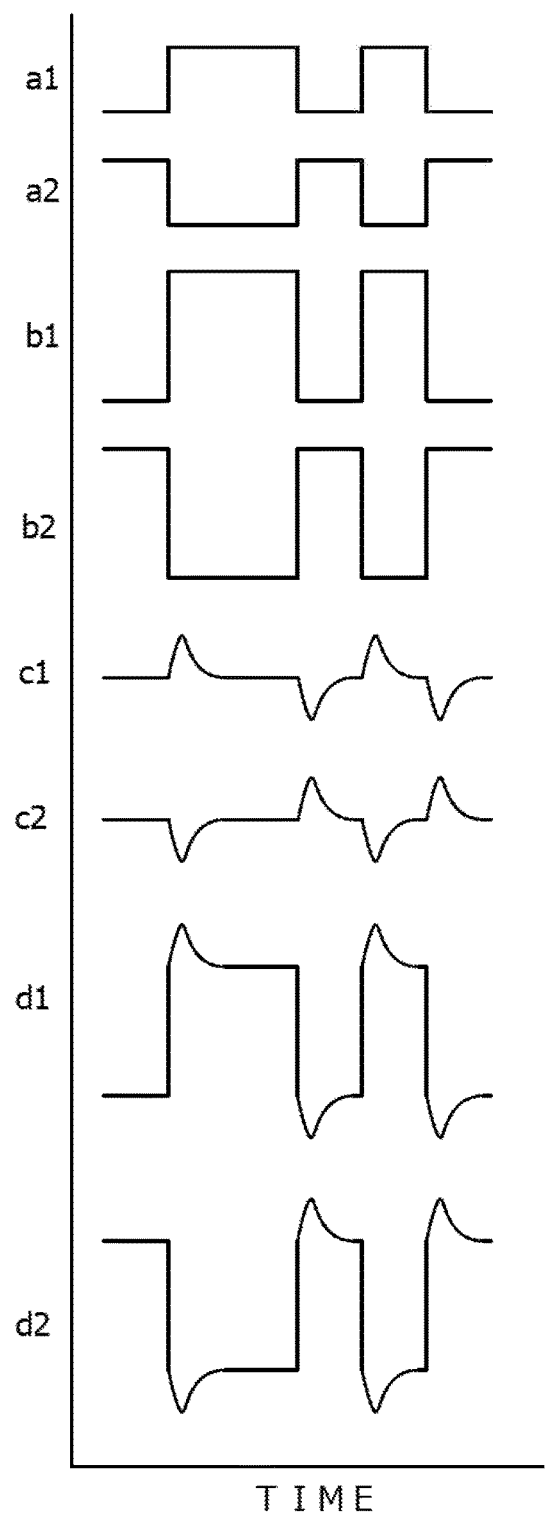

EQUALIZER CIRCUIT AND OPTICAL MODULE

CROSS-REFERENCE TO RELATED APPLICATION

This application is based upon and claims the benefit of priority of the prior Japanese Patent Application No. 2016-114561, filed on Jun. 8, 2016, the entire contents of which are incorporated herein by reference.

FIELD

The embodiments discussed herein are related to an equalizer circuit and an optical module.

BACKGROUND

An equalizer circuit, implemented by one of the signal conditioning technologies used in data transmission, is a compensation circuit that adjusts the frequency response of a transmission signal.

Related technologies are disclosed in Japanese Laid-open Patent Publication Nos. 2000-299619 and 2009-171406.

SUMMARY

According to an aspect of the embodiments, an equalizer circuit includes: a pair of input terminals: a differential amplification circuit outputs, to a pair of output terminals, first signals obtained by amplifying a difference in levels of input signals supplied to the pair of input terminals; and a differential differentiation amplification circuit that outputs, to the pair of output terminals, second signals obtained by amplifying a time-varying change in the difference in the levels of the input signals supplied to the pair of input terminals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates signal waveforms at individual parts in an equalizer circuit;

DESCRIPTION OF EMBODIMENTS

A transmission line through which a high-speed differential signal is transmitted, for example, functions as a low-pass filter, so the high-frequency component of a signal that propagates in the transmission line is attenuated. As a distance over which the signal is transmitted is prolonged and as the frequency of the signal becomes higher, the amount of attenuation is increased. When a high-speed differential signal is transmitted, therefore, an inter-symbol interference jitter becomes large, so it may become difficult to accurately transfer data. In this case, an equalizer circuit, for example, is used. An equalizer circuit compensates the frequency response of a signal by boosting its high-frequency component, which would otherwise be lost due to the low-pass filter property of the transmission line.

For example, an equalizer circuit is provided that includes a pair of differentially connected transistors, a resistive element and capacitor that are connected in parallel between the emitters of the pair of transistors, and current sources, each of which is connected to one of the emitters of the pair of transistors.

Figure 1:
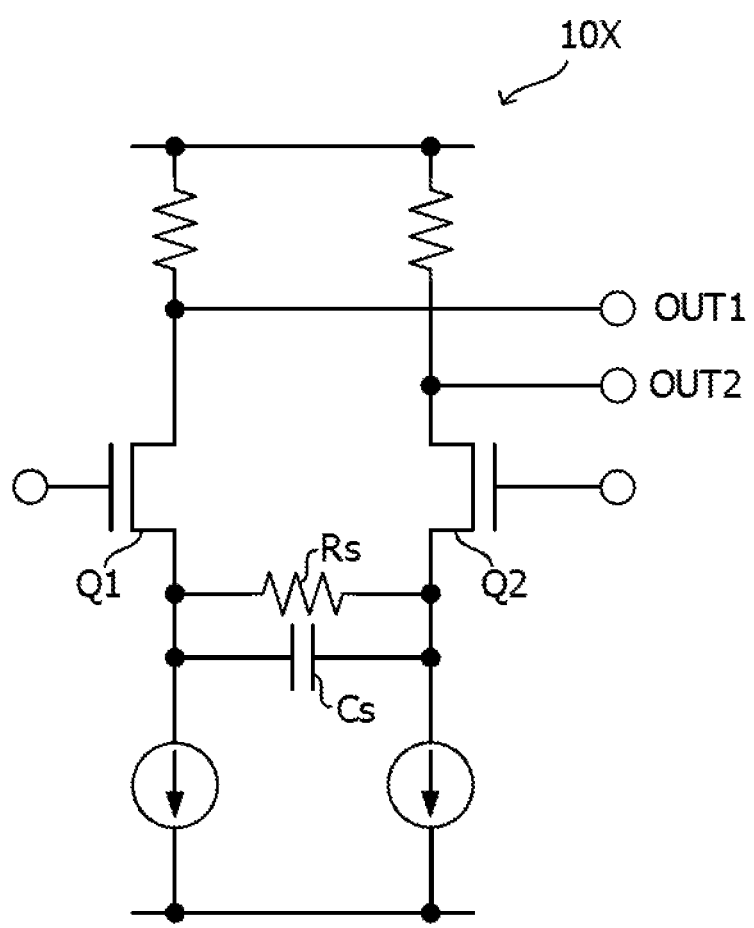
FIG. 1 illustrates an example of an equalizer circuit.
Figure 2:
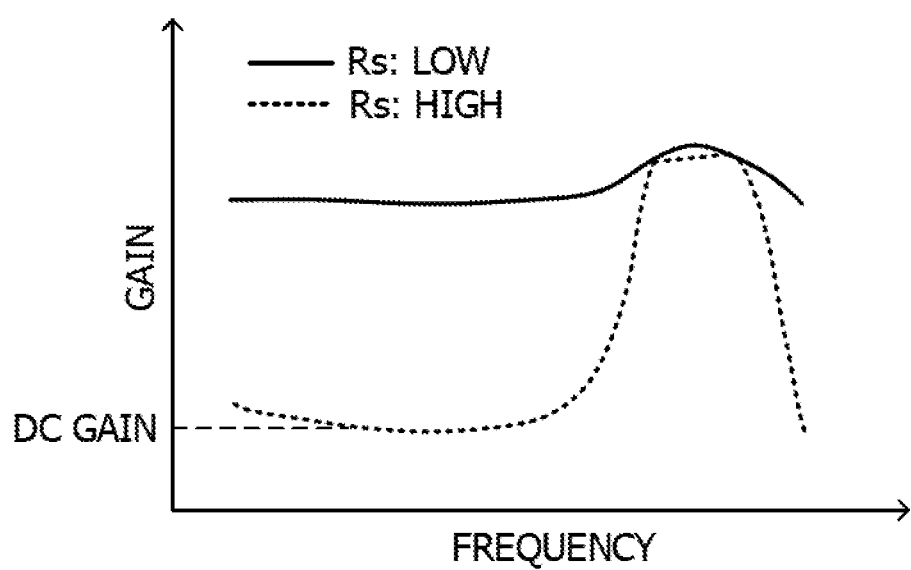
FIG. 2 illustrates an example of the frequency response of the output gain of an equalizer circuit.

FIG. 1 illustrates an example of an equalizer circuit. The equalizer circuit 10X illustrated in FIG. 1 includes a pair of transistors Q1 and Q2 as well as a resistive element Rs and a capacitor C connected in parallel between the sources of the transistors Q1 and Q2. To obtain a larger compensation strength (emphasis strength) in the equalizer circuit 10X, for example, the resistance of the resistive element Rs connected between the sources of the pair of transistors Q1 and Q2 is increased. When the resistance of the resistive element Rs is increased, the amplitudes of output signals output from differential output terminals OUT1 and OUT2, which are, for example, DC gains, are reduced. FIG. 2 illustrates an example of the frequency response of the output gain of an equalizer circuit. The solid line indicates a frequency response in a case in which the resistance of the resistive element Rs is low, and the broken line indicates a frequency response in a case in which the resistance of the resistive element Rs is high. Thus, in the equalizer circuit 10X illustrated in FIG. 1, since it is difficult to adjust the compensation strength (emphasis strength) independently of the output amplitudes. To obtain a large compensation strength (emphasis strength), therefore, the output amplitudes are reduced.

To invalidate the compensation effect in the equalizer circuit 10X, metal-oxide-semiconductor (MOS) transistors provided at both ends of the resistive element Rs are switched on to short both ends of the resistive element Rs, for example. However, a switched-on resistance due to the MOS transistors remains between the emitters of the pair of transistors Q1 and Q2. This remaining resistance reduces the amplitudes of the output signals.

Figure 3:
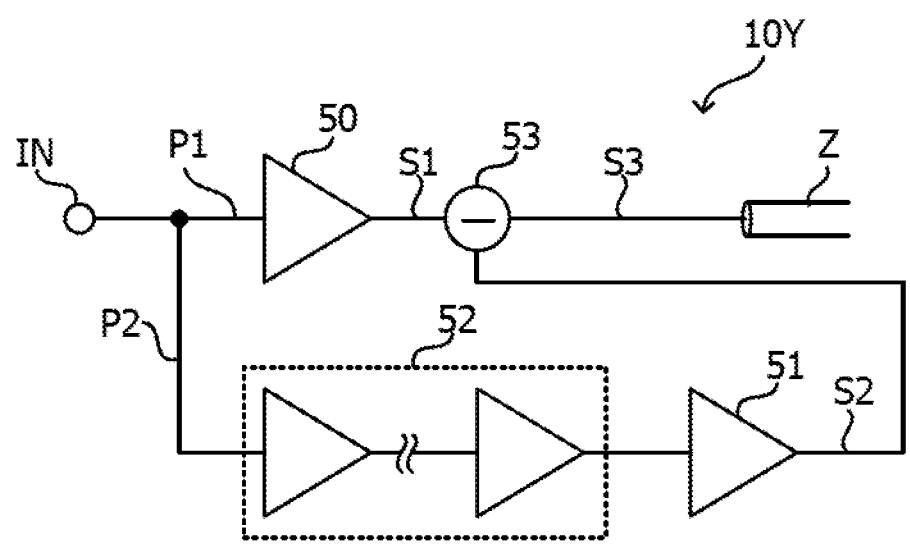
FIG. 3 illustrates an example of an equalizer circuit.

FIG. 3 illustrates an example of an equalizer circuit. The equalizer circuit 10Y in FIG. 3 includes an input terminal IN, a first differential amplification circuit 50, which is placed on a main path P1, a subtraction circuit 53, which is also placed on the main path P1, a second differential amplification circuit 51, which is placed on a branch path P2, and an amplification circuit group 52, which is also placed on the branch path P2. The subtraction circuit 53 subtracts an output signal S2 output from the second differential amplification circuit 51 from an output signal S1 output from the first differential amplification circuit 50, outputs the resulting signal as an output signal S3 output from the equalizer circuit 10Y, and sends the output signal S3 to a transmission line Z.

An input signal supplied from the input terminal IN passes through the branch path P2 having a comparatively long line length, and reaches the second differential amplification circuit 51 at a time later than a time at which the input signal reaches the first differential amplification circuit 50. Therefore, the phase of the output signal S2 output from the second differential amplification circuit 51 is delayed with respect to the phase of the output signal S1 output from the first differential amplification circuit 50. The amplification circuit group 52, which includes a plurality of amplification circuits connected in series, fulfills the role of recovering of the amplitude of the input signal that passes through the branch path P2 and thereby the amplitude of which is attenuated.

Figure 4:
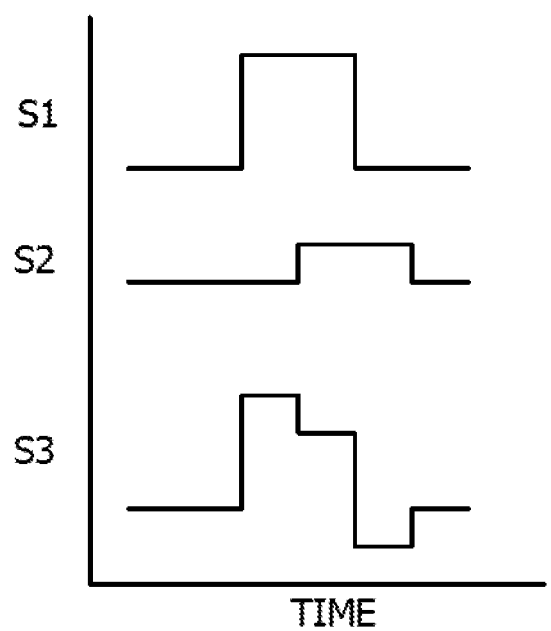
FIG. 4 illustrates an example of a timing chart of signals output from individual parts of an equalizer circuit.

FIG. 4 illustrates an example of a timing chart of signals output from individual parts of an equalizer circuit. In FIG. 4, the output signal S1 output from the first differential amplification circuit 50, the output signal S2 output from the second differential amplification circuit 51, and the output signal S3 output from the subtraction circuit 53 are illustrated. The subtraction circuit 53 subtracts the output signal S2 output from the second differential amplification circuit 51, the output signal S2 having been delayed, from the output signal S1 output from the first differential amplification circuit 50, and outputs the resulting output signal S3 having a waveform that compensates the high-frequency component for attenuation caused in the transmission line Z.

In the equalizer circuit 10Y, tail current control by the second differential amplification circuit 51 enables compensation strength (emphasis strength) to be adjusted independently of the output amplitude. For example, since the branch path P2 in the equalizer circuit 10Y includes multi-stage amplification circuits, power consumption may be large.

An equalizer circuit is disposed at a different place in a circuit depending on its application. An equalizer circuit that compensates for waveform deterioration in a received signal, for example, is disposed at a position close to an input part in the interior of a circuit. In this case, the signal amplitude is finally adjusted by an amplification circuit at a later stage, so the output signal amplitude in the equalizer circuit itself is not a problem. For example, an output-stage equalizer circuit used to compensate for waveform deterioration caused in a transmission line connected to the output side of a circuit may be placed in the output block of the circuit. In this case, the equalizer circuit not only compensates for waveform distortion, but also outputs a signal with an adequately large amplitude and freely adjusts, according to a deteriorating line on the outside, an amount by which signal distortion is compensated for. These pieces of processing may be achieved at low power consumption.

For example, an equalizer circuit and an optical module may be provided that can adjust compensation strength (emphasis strength) at low power consumption without lowering a signal amplitude.

On the drawings, like or equivalent constituent elements and portions are assigned like reference characters.

Figure 5A:
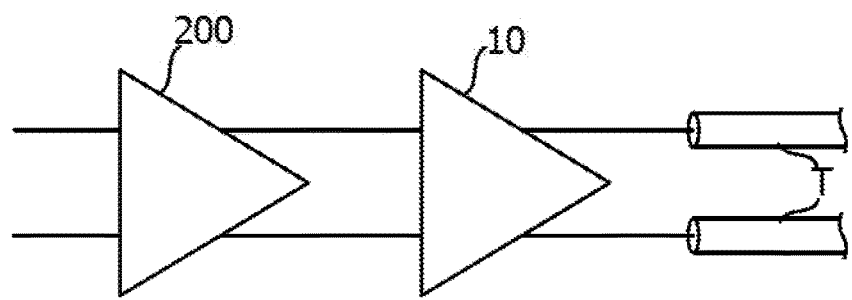
FIG. 5A illustrates an example of the usage of an equalizer circuit.
Figure 5B:
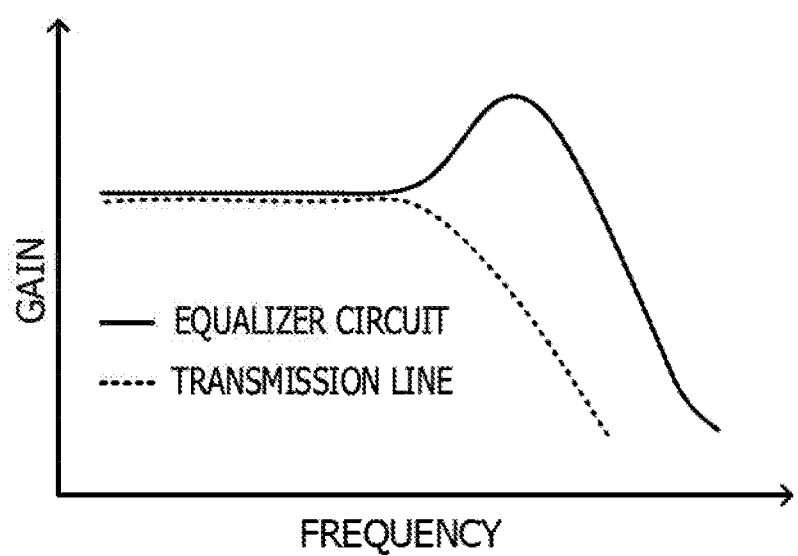
FIG. 5B illustrates examples of the frequency responses of the equalizer circuit and transmission lines.

FIG. 5A illustrates an example of the usage of an equalizer circuit. The equalizer circuit 10 is a circuit that adjusts the frequency response of a signal supplied from a pre-circuit 200 and outputs the adjusted signal to a transmission line Z. The transmission lines Z may be differential transmission lines. FIG. 5B illustrates examples of the frequency responses of the equalizer circuit and transmission lines. The solid line corresponds to the equalizer circuit 10, and the dashed line corresponds to the transmission line Z. As illustrated in FIG. 5B, the transmission line Z functions a low-pass filter and the high-frequency component of a signal that propagates in the transmission line Z is attenuated. The equalizer circuit 10 compensates the frequency response of a signal that passes through the transmission line Z by boosting the high-frequency component, which would otherwise be lost in the transmission line Z.

Figure 6:
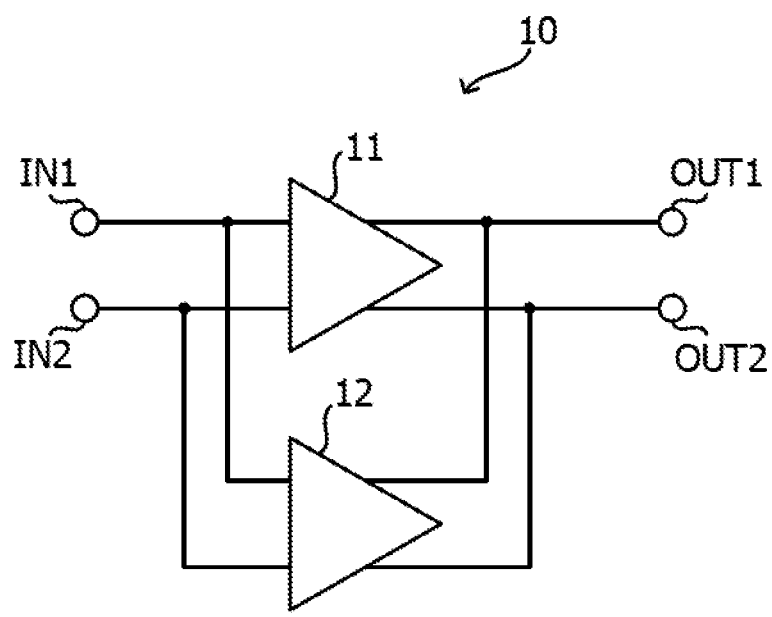
FIG. 6 illustrates an example an equalizer circuit.

FIG. 6 illustrates an example of an equalizer circuit. The equalizer circuit 10 includes a pair of differential input terminals IN1 and IN2, a pair of differential output terminals OUT1 and OUT2, a differential amplification circuit 11, and a differential differentiation amplification circuit 12. The input ends of the differential amplification circuit 11 and the input ends of the differential differentiation amplification circuit 12 are both connected to the differential input terminals IN1 and IN2. The output ends of the differential amplification circuit 11 and the output ends of the differential differentiation amplification circuit 12 are both connected to the differential output terminals OUT1 and OUT2.

The differential amplification circuit 11 outputs differentially amplified signals, which are obtained by amplifying a difference in the levels of input signals supplied to the differential input terminals IN1 and IN2, to the differential output terminals OUT1 and OUT2. The differential differentiation amplification circuit 12 outputs differentially differentiated amplified signals, which are obtained by amplifying time-varying changes in differences in the levels of the input signals supplied to the differential input terminals IN1 and IN2, to the differential output terminals OUT1 and OUT2. The sums of the output signals from the differential amplification circuit 11 and the output signals from the differential differentiation amplification circuit 12 appear at the differential output terminals OUT1 and OUT2.

Figure 7:
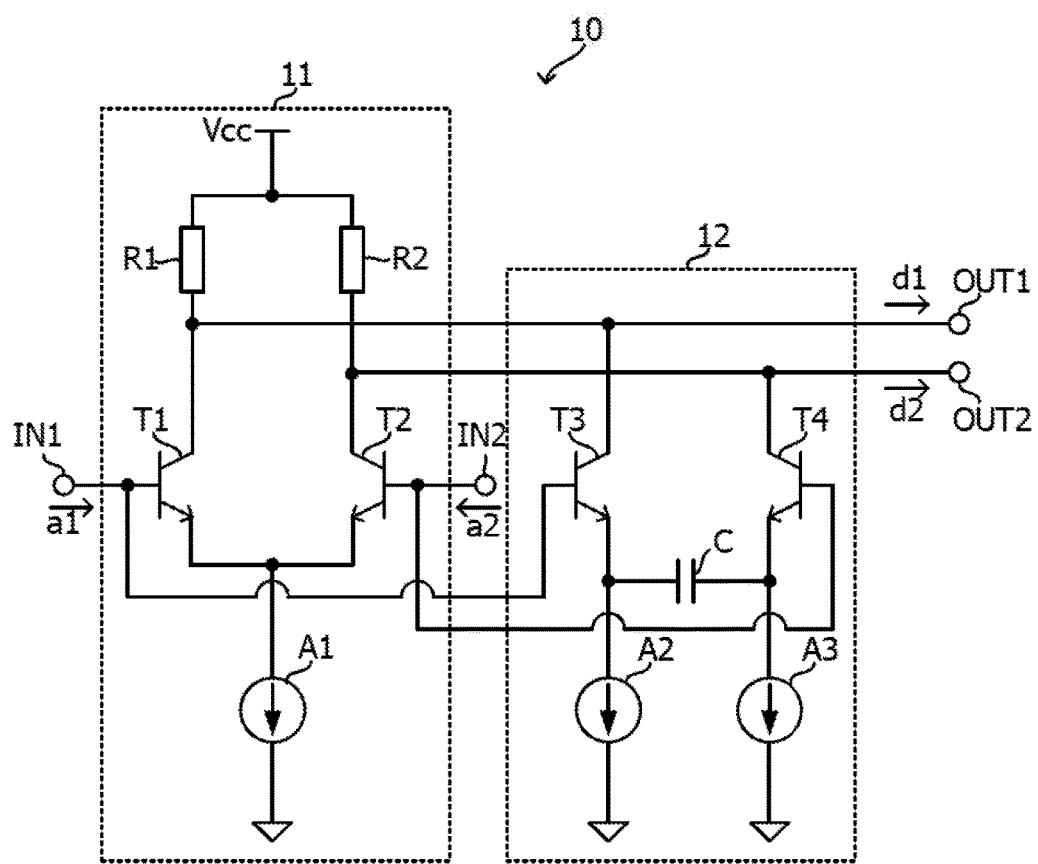
FIG. 7 illustrates an example of an equalizer circuit.

FIG. 7 illustrates an example of an equalizer circuit. The differential amplification circuit 11 includes a pair of transistors T1 and T2, load resistors R1 and R2, and a current source A1. The transistors T1 and T2 are each a bipolar transistor. The base of the transistor T1 is connected to the differential input terminal IN1, and the base of the transistor T2 is connected to the differential input terminal IN2. The collector of the transistor T1 is connected one end of the load resistor R1 and the differential output terminal OUT1. The collector of the transistor T2 is connected to one end of the load resistor R2 and the differential output terminal OUT2. The emitter of the transistor T1 and the emitter of the transistor T2 are mutually connected and are also connected to the current source A1. The other ends of the load resistors R1 and R2 are connected to a power supply line Vcc.

The differential differentiation amplification circuit 12 includes a pair of transistors T3 and T4, a capacitor C, and current sources A2 and A3. The transistors T3 and T4 are each a bipolar transistor. The base of the transistor T3 is connected to the differential input terminal IN1, and the base of the transistor T4 is connected to the differential input terminal IN2. The collector of the transistor T3 is connected one end of the load resistor R1 and the differential output terminal OUT1. The collector of the transistor T4 is connected to one end of the load resistor R2 and the differential output terminal OUT2. The emitter of the transistor T3 is connected one end of the capacitor C and the current source A2, and the emitter of the transistor T4 is connected to the other end of the capacitor C and the current source A3. For example, the emitter of the transistor T3 and the emitter of the transistor T4 are mutually connected with the capacitor C intervening therebetween. Input signals a1 and a2 are respectively input to the differential input terminals IN1 and IN2 from the pre-circuit 200 (see FIG. 5), and output signals d1 and d2, which are respectively output from the differential output terminals OUT1 and OUT2, are supplied to the transmission lines Z (see FIG. 5).

Figure 9A:
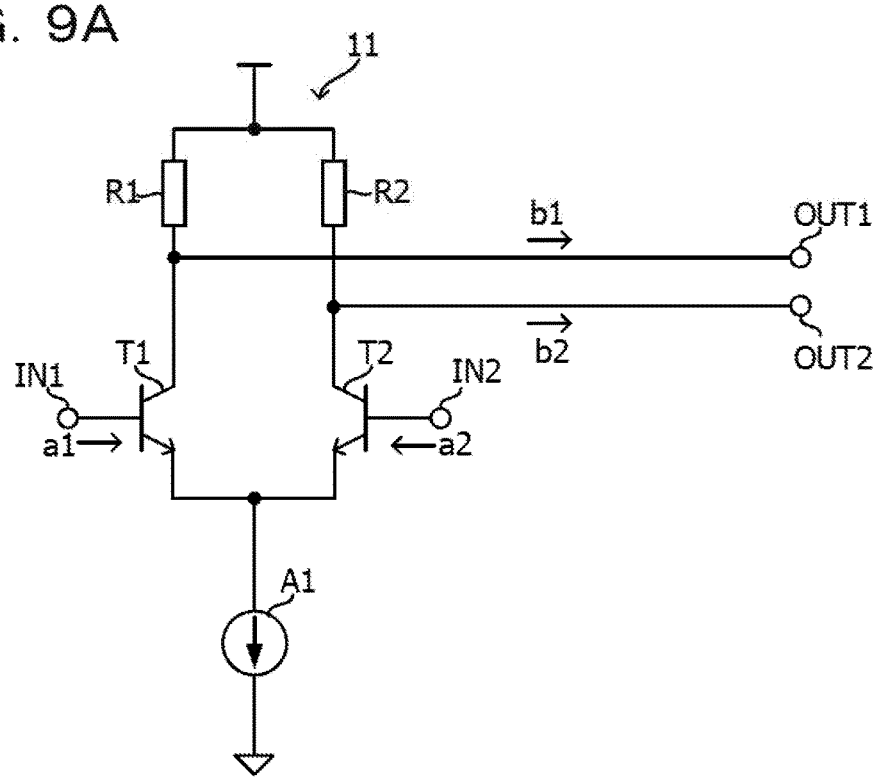
FIG. 9A illustrates an example of a structure in a case in which it is assumed that there is no differential differentiation amplification circuit in an equalizer circuit.
Figure 9B:
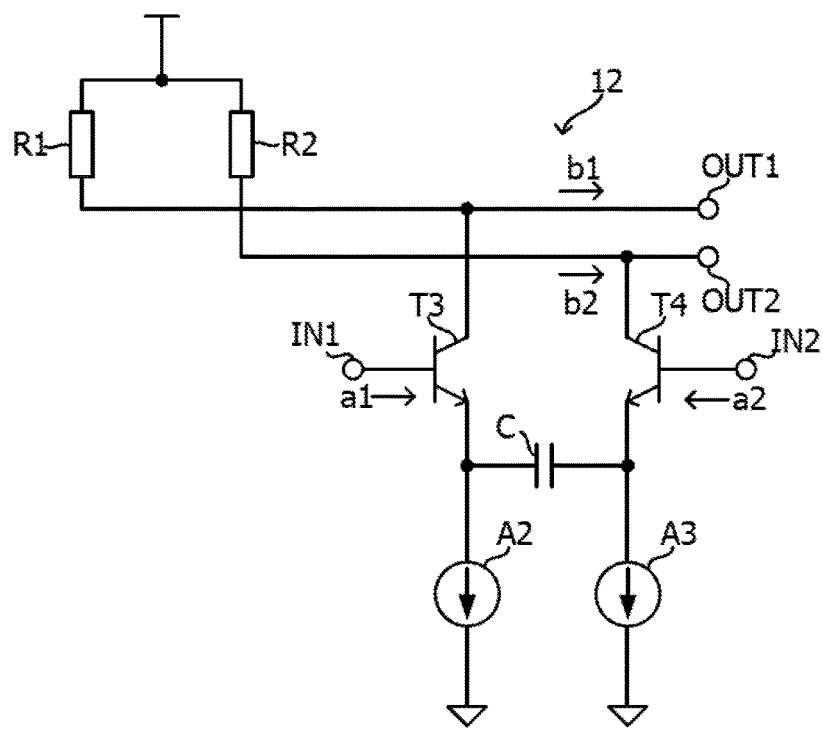
FIG. 9B illustrates an example of a structure in a case in which it is assumed that there is no differential amplification circuit in an equalizer circuit.

FIG. 8 illustrates signal waveforms at individual parts in an equalizer circuit. FIG. 9A illustrates an example of a structure in a case in which it is assumed that there is no differential differentiation amplification circuit in an equalizer circuit, and FIG. 9B illustrates an example of a structure in a case in which it is assumed that there is no differential amplification circuit in an equalizer circuit. In FIG. 8, a1 and a2 respectively indicate input signals supplied to the differential input terminals IN1 and IN2 in the equalizer circuit 10. In FIG. 8, b1 and b2 respectively indicate signals (differentially amplified signals) that appear at the differential output terminals OUT1 and OUT2 in a case in which it is assumed that the differential differentiation amplification circuit 12 is not provided in the equalizer circuit 10 as illustrated in FIG. 9A. The differential amplification circuit 11 outputs the differentially amplified signals b1 and b2, obtained by amplifying a difference in the levels of the input signals a1 and a2, to the differential output terminals OUT1 and OUT2, respectively.

In FIG. 8, c1 and c2 respectively indicate signals (differentially differentiated amplified signal) that appear at the differential output terminals OUT1 and OUT2 in a case in which it is assumed that the differential amplification circuit 11 is not provided in the equalizer circuit 10 as illustrated in FIG. 9B. For example, the load resistors R1 and R2 are connected to the differential differentiation amplification circuit 12. The differential differentiation amplification circuit 12 outputs the differentially differentiated amplified signals c1 and c2, which are obtained by amplifying time-varying changes in differences in the levels of the input signals a1 and a2, to the differential output terminals OUT1 and OUT2, respectively.

In FIG. 8, d1 and d2 respectively indicate output signals that appear at the differential output terminals OUT1 and OUT2 in the equalizer circuit 10 that has a certain structure that includes both the differential amplification circuit 11 and differential differentiation amplification circuit 12 as illustrated in FIG. 7. The equalizer circuit 10 having the certain structure outputs, to the differential output terminal OUT1, the output signal d1 equivalent to the sum of the differentially amplified signal b1 and differentially differentiated amplified signal c1. The equalizer circuit 10 having the certain structure outputs, to the differential output terminal OUT2, the output signal d2 equivalent to the sum of the differentially amplified signal b2 and differentially differentiated amplified signal c2. The signal waveforms of the output signals d1 and d2 each have a shape having a peak at an edge. When the equalizer circuit 10 creates the output signals d1 and d2 having this type of waveform, the high-frequency component of a signal is compensated, the high-frequency component being attenuated in a transmission line.

In the equalizer circuit 10, the amplitudes of the output signals d1 and d2 may be adjusted depending on the magnitude of the current flowing in the current source A1. The larger the magnitude of the current flowing in the current source A1 is, the larger the amplitudes of the output signals d1 and d2 are. The amplitudes indicate the amplitudes of the DC components of the output signals d1 and d2, such as, for example, the amplitudes of the differentially amplified signals b1 and b2. In the equalizer circuit 10, no resistive element is connected to the emitters of the transistors T1 and T2. For example, the equalizer circuit 10 includes no circuit element that lowers the amplitudes of the output signals d1 and d2. Therefore, desired amplitudes may be obtained in the output signals d1 and d2.

Figure 10A:
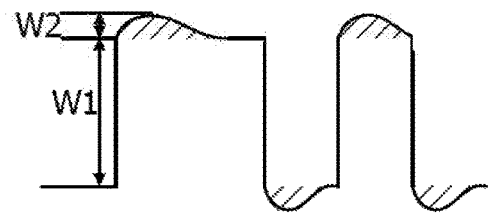
FIGS. 10A to 10C each illustrate an example of the waveform of an output signal from an equalizer circuit.
Figure 10B:
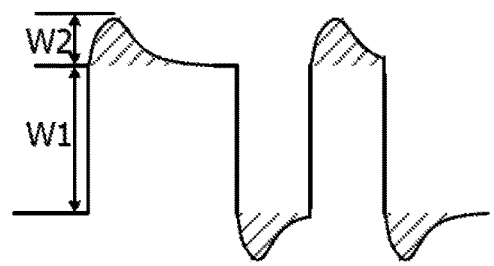
Figure 10C:
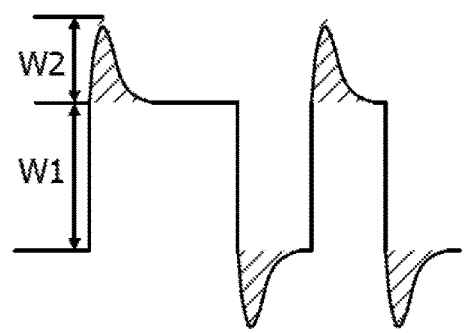

In the equalizer circuit 10, the compensation strength (emphasis strength) of the output signals d1 and d2 may be adjusted depending on the magnitudes of currents flowing in the current sources A2 and A3. FIGS. 10A to 10C each illustrate an example of the waveform of an output signal from an equalizer circuit. FIG. 10A illustrates the waveform of an output signal from the equalizer circuit 10 in a case in which the magnitudes of currents flowing in the current sources A2 and A3 are comparatively small. FIG. 10B illustrates the waveform of an output signal from the equalizer circuit 10 in a case in which the magnitudes of currents flowing in the current sources A2 and A3 are middle. FIG. 10C illustrates the waveform of an output signal from the equalizer circuit 10 in a case in which the magnitudes of currents flowing in the current sources A2 and A3 are comparatively large.

In the output signal waveforms illustrated in FIGS. 10A to 10C, each hatched waveform is equivalent to a differentially differentiated amplified signal output from the differential differentiation amplification circuit 12; the amplitude at this portion is denoted W2. In the output signal waveforms illustrated in FIGS. 10A to 10C, each portion other than the hatched waveforms is equivalent to a differentially amplified signal output from the differential amplification circuit 11; the amplitude at this portion is denoted W1. The compensation strength (emphasis strength) of an output signal may be represented by the ratio of W2 to W1 (W2/W1).

As illustrated in FIGS. 10A to 10C, the larger the magnitudes of currents flowing in the current sources A2 and A3 are, the larger the amplitude W2 of a portion equivalent to a differentially differentiated amplified signal is. The amplitude W1 of a portion equivalent to a differentially amplified signal does not change depending on the currents flowing in the current sources A2 and A3. Therefore, the larger the magnitudes of currents flowing in the current sources A2 and A3 are, the larger the compensation strength (emphasis strength) of an output signal is.

Figure 11A:
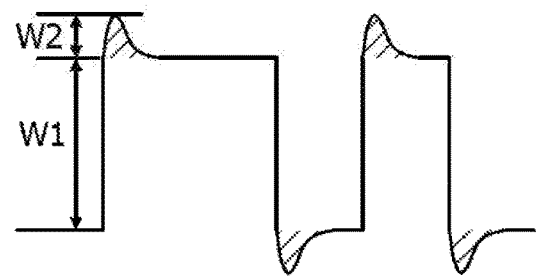
FIGS. 11A to 11C each illustrate an example of the waveform of an output signal from an equalizer circuit.
Figure 11B:
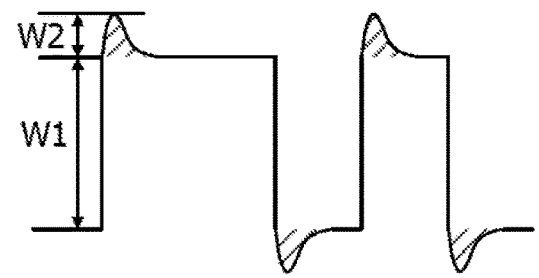
Figure 11C:
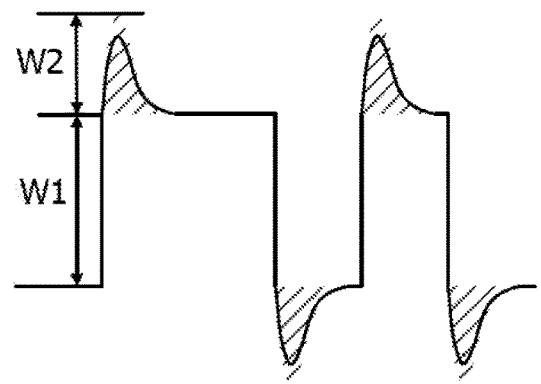

In the equalizer circuit 10, the maximum compensation strength (maximum emphasis strength) of an output signal may be adjusted depending on the capacitance of the capacitor C. For example, the maximum compensation strength (maximum emphasis strength) is limited by the capacitance of the capacitor C. FIGS. 11A to 11C each illustrate an example of the waveform of an output signal from an equalizer circuit. FIG. 11A illustrates the waveform of an output signal from the equalizer circuit 10 in a case in which the capacitance of the capacitor C is comparatively small and the magnitudes of currents flowing in the current sources A2 and A3 are comparatively small. FIG. 11B illustrates the waveform of an output signal from the equalizer circuit 10 in a case in which the capacitance of the capacitor C is comparatively small and the magnitudes of currents flowing in the current sources A2 and A3 are comparatively large. FIG. 11C illustrates the waveform of an output signal from the equalizer circuit 10 in a case in which the capacitance of the capacitor C is comparatively large and the magnitudes of currents flowing in the current sources A2 and A3 are comparatively large.

In a comparison between FIGS. 11A and 11B, when the capacitance of the capacitor C is comparatively small, even if the magnitudes of currents flowing in the current sources A2 and A3 are changed, there is a case in which the amplitude W2 of a portion equivalent to a differentially differentiated amplified signal does to change. For example, when the capacitance of the capacitor C is comparatively small, compensation strength (emphasis strength) is saturated at a stage at which the magnitudes of currents flowing in the current sources A2 and A3 are comparatively small. When the capacitance of the capacitor C is increased, compensation strength (emphasis strength) becomes large. As illustrated in FIG. 11C, the amplitude W2 of a portion equivalent to a differentially differentiated amplified signal becomes large as the magnitudes of currents flowing in the current sources A2 and A3 become large.

According to the equalizer circuit 10, compensation strength (emphasis strength) is adjusted without the amplitude of an output signal being lowered. For example, compensation strength (emphasis strength) may be adjusted independently of the amplitude of an output signal. Since the equalizer circuit 10 lacks multistage amplification circuits such as the amplification circuit group 52 illustrated in FIG. 3, low consumption may be achieved.

An output-side equalizer circuit used to compensate for waveform deterioration caused in a transmission line connected to the output side of a circuit may be disposed in the output block of the circuit. In this case, the equalizer circuit may not only compensate for waveform distortion but also output a signal with an adequately large amplitude and freely adjust, according to a deteriorating line on the outside, an amount by which signal distortion is compensated for. These pieces of processing may be achieved at low power consumption. The equalizer circuit 10 described above may be a form suitable to an output-side equalizer.

In the equalizer circuit 10, the capacitance of the capacitor C is increased as much as possible to increase the maximum compensation strength (maximum emphasis strength). For example, in a case in which the capacitance of the capacitor C is comparatively large, when the magnitudes of currents flowing in the current sources A2 and A3 are comparatively small, ringing may occur in an output signal in the equalizer circuit 10.

Figure 12:
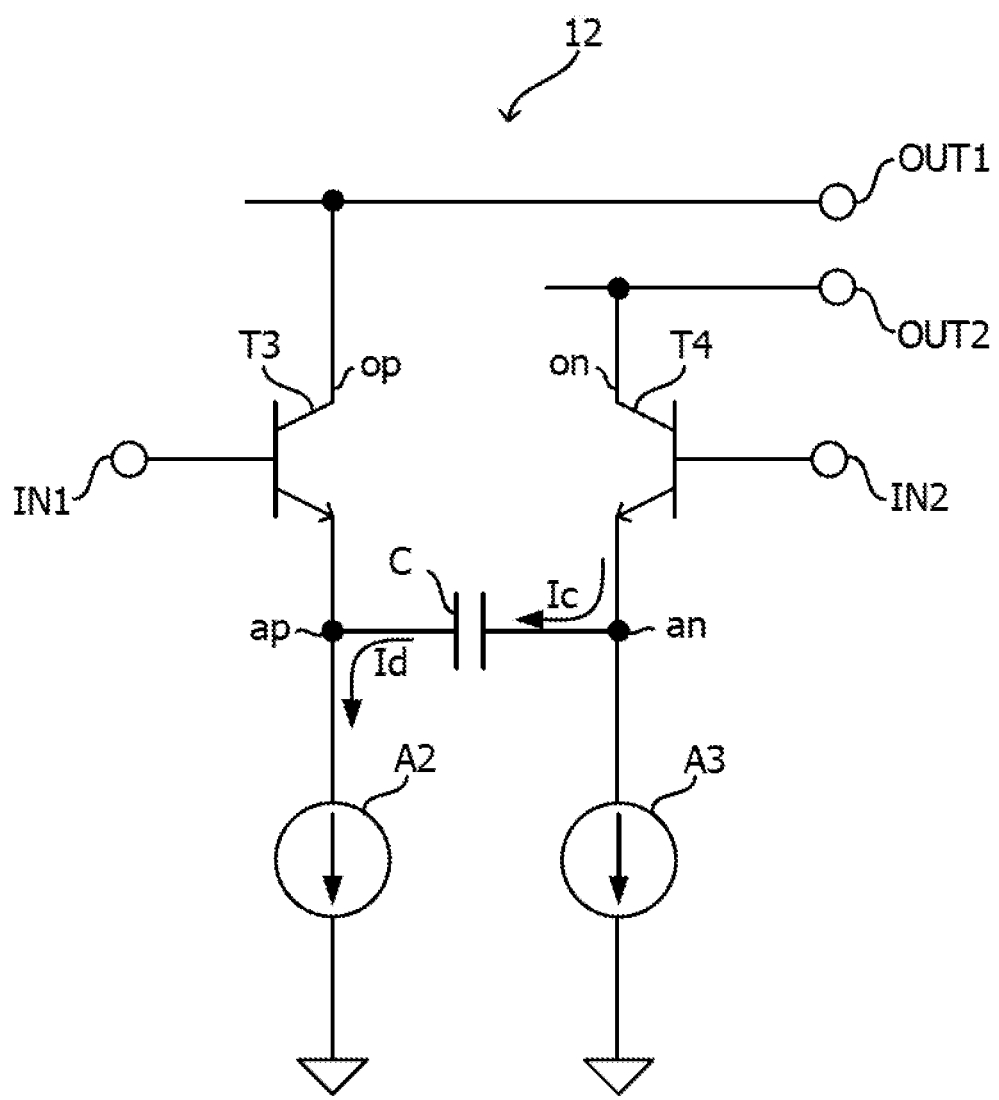
FIG. 12 illustrates an example of a differential differentiation amplification circuit.

FIG. 12 illustrates an example of a differential differentiation amplification circuit. In the differential differentiation amplification circuit 12, at a timing at which the transistor T4 shifts to a turned-on state and the transistor T3 shifts to a turned-off state, for example, a charge current Ic flows into the capacitor C and a discharge current Id exits from the capacitor C. For example, the transistors T3 and T4 have an asymmetric property in which a time taken to shift from the turned-on state to the turned-off state is longer than a time taken to shift from the turned-off state to the turned-on state. Due to this asymmetric property, the discharge time of the capacitor C may be longer than its charge time.

Figure 13A:
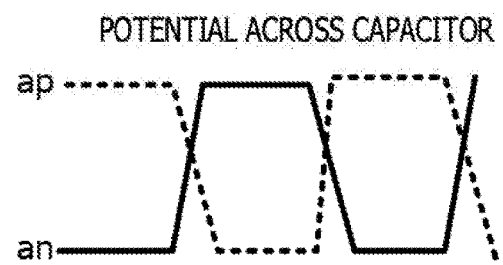
FIG. 13A illustrates an example of a voltage waveform across a capacitor in a differential differentiation amplification circuit.
Figure 13B:
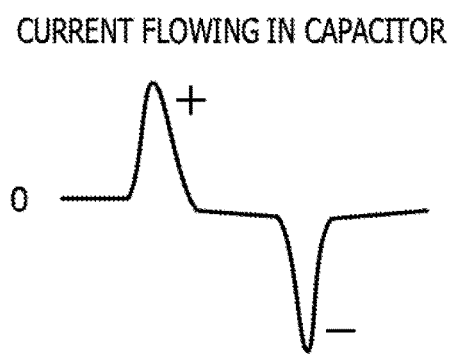
FIG. 13B illustrates an example of the waveform of a current flowing in the capacitor in the differential differentiation amplification circuit.
Figure 13C:
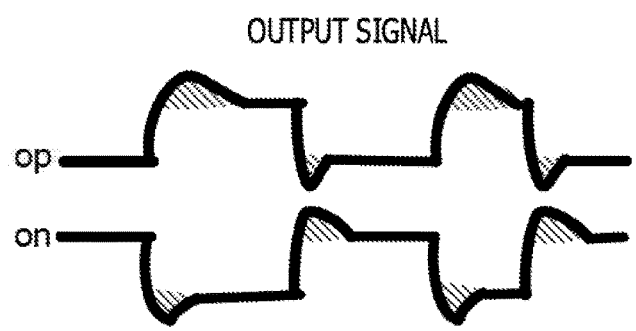
FIG. 13C illustrates an example of the waveform of an output signal from an equalizer circuit.
Figure 14A:
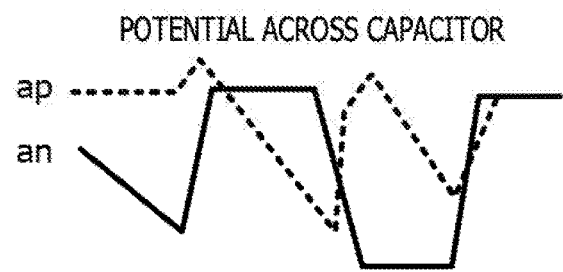
FIG. 14A illustrates an example of a voltage waveform across a capacitor in a differential differentiation amplification circuit.
Figure 14B:
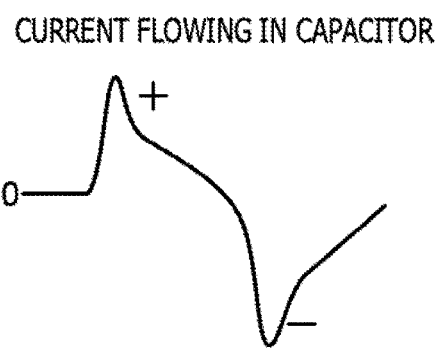
FIG. 14B illustrates an example of the waveform of a current flowing in the capacitor in the differential differentiation amplification circuit.
Figure 14C:
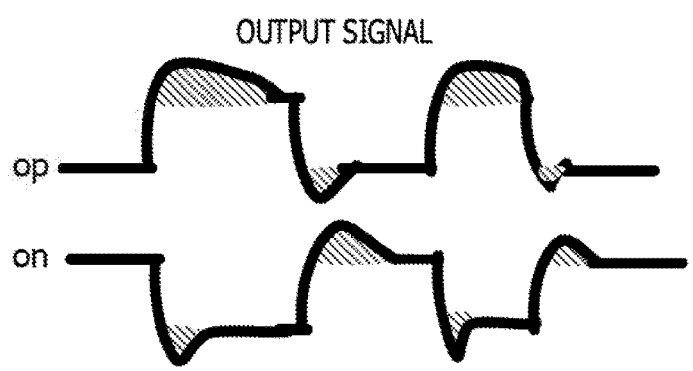
FIG. 14C illustrates an example of the waveform of an output signal from an equalizer circuit.

FIGS. 13A and 14A each illustrate an example of a voltage waveform across a capacitor in a differential differentiation amplification circuit. FIGS. 13B and 14B each illustrate an example of the waveform of a current flowing in the capacitor in the differential differentiation amplification circuit. FIGS. 13C and 14C each illustrate an example of the waveform of an output signal from an equalizer circuit. FIGS. 13A to 13C illustrate waveforms at individual portions in a case in which the capacitance of the capacitor C is comparatively large and the magnitudes of currents flowing in the current sources A2 and A3 are comparatively large. FIGS. 14A and 14C illustrate waveforms at individual portions in a case in which the capacitance of the capacitor C is comparatively large and the magnitudes of currents flowing in the current sources A2 and A3 are comparatively small. FIGS. 13A and 14A each illustrate a voltage waveform across nodes ap and an, which are nodes at both ends of the capacitor C. FIGS. 13B and 14B each illustrate the waveform of a current flowing in the capacitor C. FIGS. 13C and 14C each illustrate the waveform of an output signal from the equalizer circuit 10.

Figure 15A:
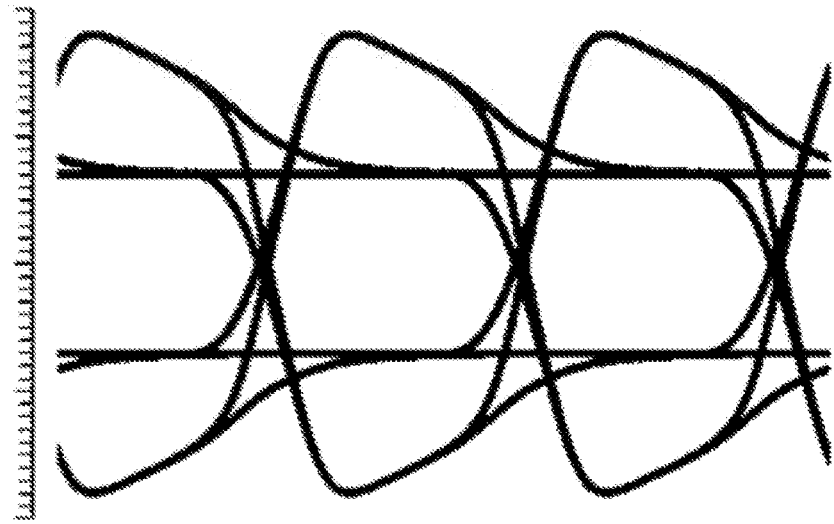
FIGS. 15A and 15B each illustrate an example of an eye diagram of an output signal from an equalizer circuit.
Figure 15B:
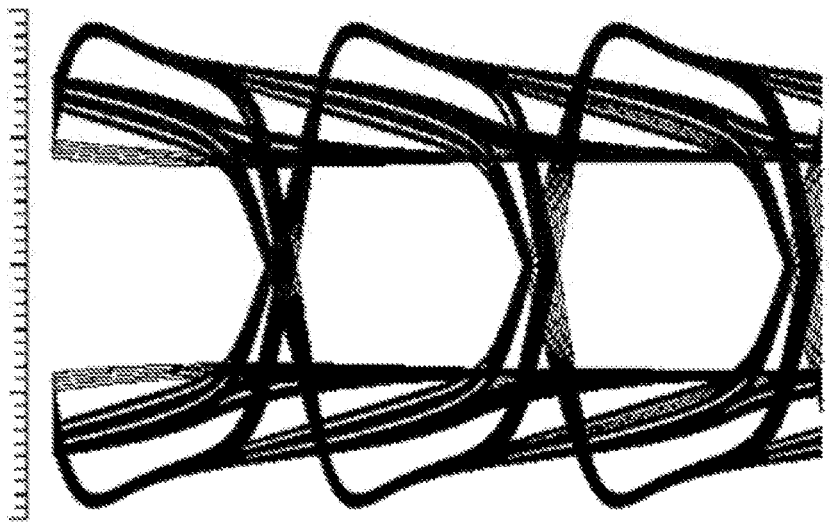

As illustrated in FIGS. 13A to 13C, even in a case in which the capacitance of the capacitor C is comparatively large, if the magnitudes of currents flowing in the current sources A2 and A3 are comparatively large, unbalance between the charge time and the discharge time in the capacitor C is not a problem. FIGS. 15A and 15B each illustrate an example of an eye diagram of an output signal from an equalizer circuit. FIG. 15A illustrates an eye diagram of an output signal from the equalizer circuit 10 in a case in which the capacitance of the capacitor C is comparatively large and the magnitudes of currents flowing in the current sources A2 and A3 are comparatively large. For example, a pseudo-random binary sequence (PRBS) signal is input to the equalizer circuit 10. Even in a case in which the capacitance of the capacitor C is comparatively large, if the magnitudes of currents flowing in the current sources A2 and A3 are comparatively large, the output signal from the equalizer circuit 10 is normal as illustrated in FIG. 15A.

As illustrated in FIGS. 14A to 14C, in a case in which the capacitance of the capacitor C is comparatively large, if the magnitudes of currents flowing in the current sources A2 and A3 are comparatively small, an increase in the discharge time in the capacitor C is noticeably increased and thereby unbalance between the charge time and the discharge time becomes noticeable. In the output signal from the equalizer circuit 10, therefore, an adverse effect due to discharging in a bit may extend to the next bit. FIG. 15B illustrates an eye diagram of an output signal from the equalizer circuit 10 in a case in which the capacitance of the capacitor C is comparatively large and the magnitudes of currents flowing in the current sources A2 and A3 are comparatively small. In a case in which the capacitance of the capacitor C is comparatively large and the magnitudes of currents flowing in the current sources A2 and A3 are comparatively small, the degree of unbalance between the charge time and the discharge time depends on a data pattern. Therefore, ringing may be observed in an eye diagram of an output signal in a case in which a PRBS signal is input.

For example, an equalizer circuit described below may have a structure by which the above ringing is reduced.

Figure 16:
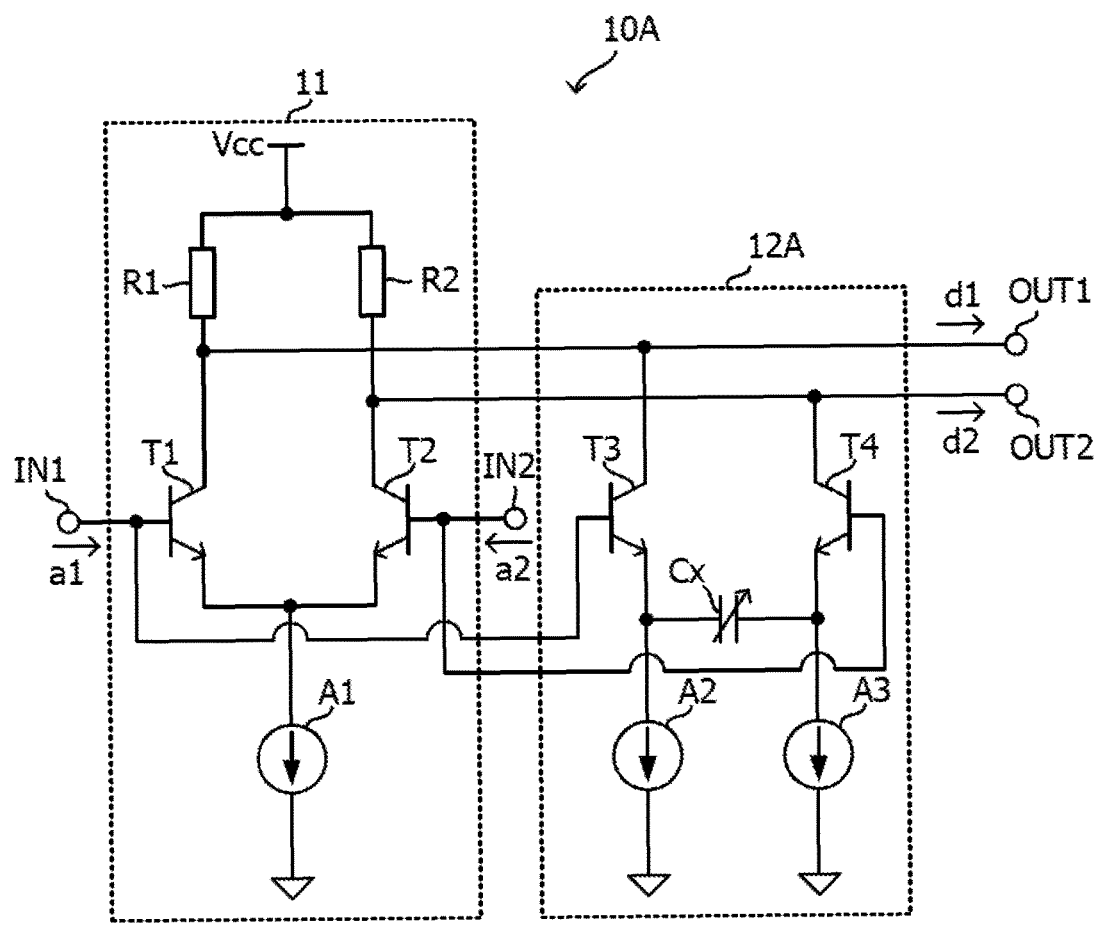
FIG. 16 illustrates an example of an equalizer circuit.

FIG. 16 illustrates an example of an equalizer circuit. The equalizer circuit 10A has a variable capacitor Cx, the capacitance of which is variable, the variable capacitor Cx being disposed between the emitters of the transistors T3 and T4 included in a differential differentiation amplification circuit 12A. Except the variable capacitor Cx, the structure in FIG. 16 may be essentially the same as or similar to the structure of the equalizer circuit 10 illustrated in FIG. 7.

In the equalizer circuit 10A, if the values of currents flowing in the current sources A2 and A3 are set to comparatively small values, the capacitance of the variable capacitor Cx is set to a comparatively small value. Therefore, the discharge time in the variable capacitor Cx is shortened, so unbalance between the charge time and the discharge time may be mitigated and thereby the risk of ringing being generated may be reduced. For example, by changing the capacitance of the variable capacitor Cx, the output gain of the differential differentiation amplification circuit 12A may not be lowered.

Figure 17:
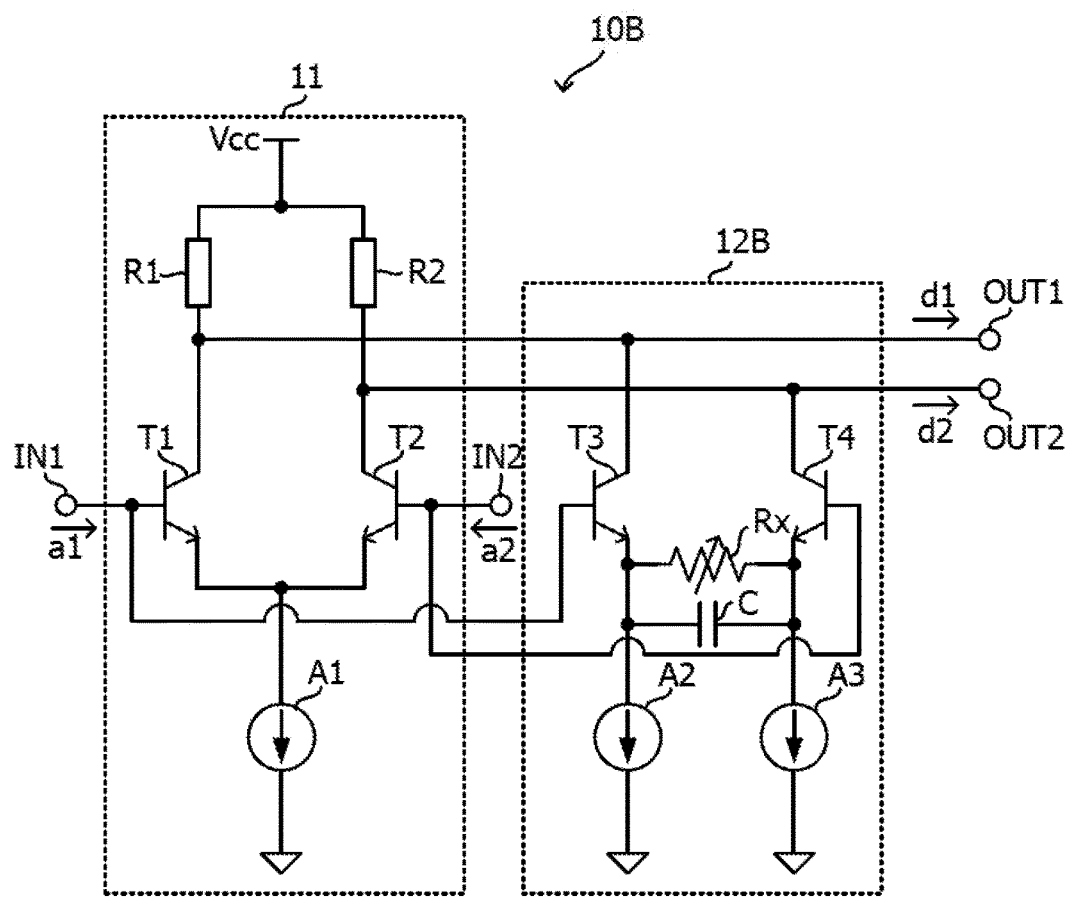
FIG. 17 illustrates an example of an equalizer circuit.

FIG. 17 illustrates an example of an equalizer circuit. The equalizer circuit 10B has a variable-resistance circuit Rx, the resistance of which is variable, connected in parallel to the capacitor C in a differential differentiation amplification circuit 12B. Except the variable-resistance circuit Rx, the structure in FIG. 17 may be essentially the same as or similar to the structure of the equalizer circuit 10 illustrated in FIG. 7. A variable-resistance circuit that includes a plurality of resistive elements connected in series and a plurality of switching elements, each of which connected in parallel to one of the plurality of resistive elements, for example, may be used as the variable-resistance circuit Rx. A known variable-resistance circuit may be used as the variable-resistance circuit Rx. By appropriately selecting switching elements to be turned on from the plurality of switching elements in the variable-resistance circuit Rx, the resistance of the variable-resistance circuit Rx is set to a desired magnitude.

Since, in the equalizer circuit 10B, the variable-resistance circuit Rx forms a current bypass path, a current flowing in the capacitor C may be lessened when compared with a case in which the variable-resistance circuit Rx is not provided. The lower the resistance of the variable-resistance circuit Rx is, the smaller the current flowing in the capacitor C is. In the equalizer circuit 10B, if the values of currents flowing in the current sources A2 and A3 are set to comparatively small values, the resistance of the variable-resistance circuit Rx is set to a comparatively small value. Accordingly, the discharge time in the capacitor C is shortened, so unbalance between the charge time and the discharge time may be mitigated and thereby the risk of ringing being generated may be reduced. In a process for a bipolar transistor, for example, the variable range of the resistance of the variable-resistance circuit Rx is expanded more easily than when the variable range of the capacitance of the variable capacitor Cx is expanded. Therefore, a mechanism that effectively suppressing ringing may be provided easily.

In the equalizer circuit 10B, the capacitor C may be replaced with the variable capacitor Cx. In this case, a parallel circuit formed by the variable-resistance circuit Rx and variable capacitor Cx may be disposed between the emitter of the transistor T3 and the emitter of the transistor T4.

Figure 18:
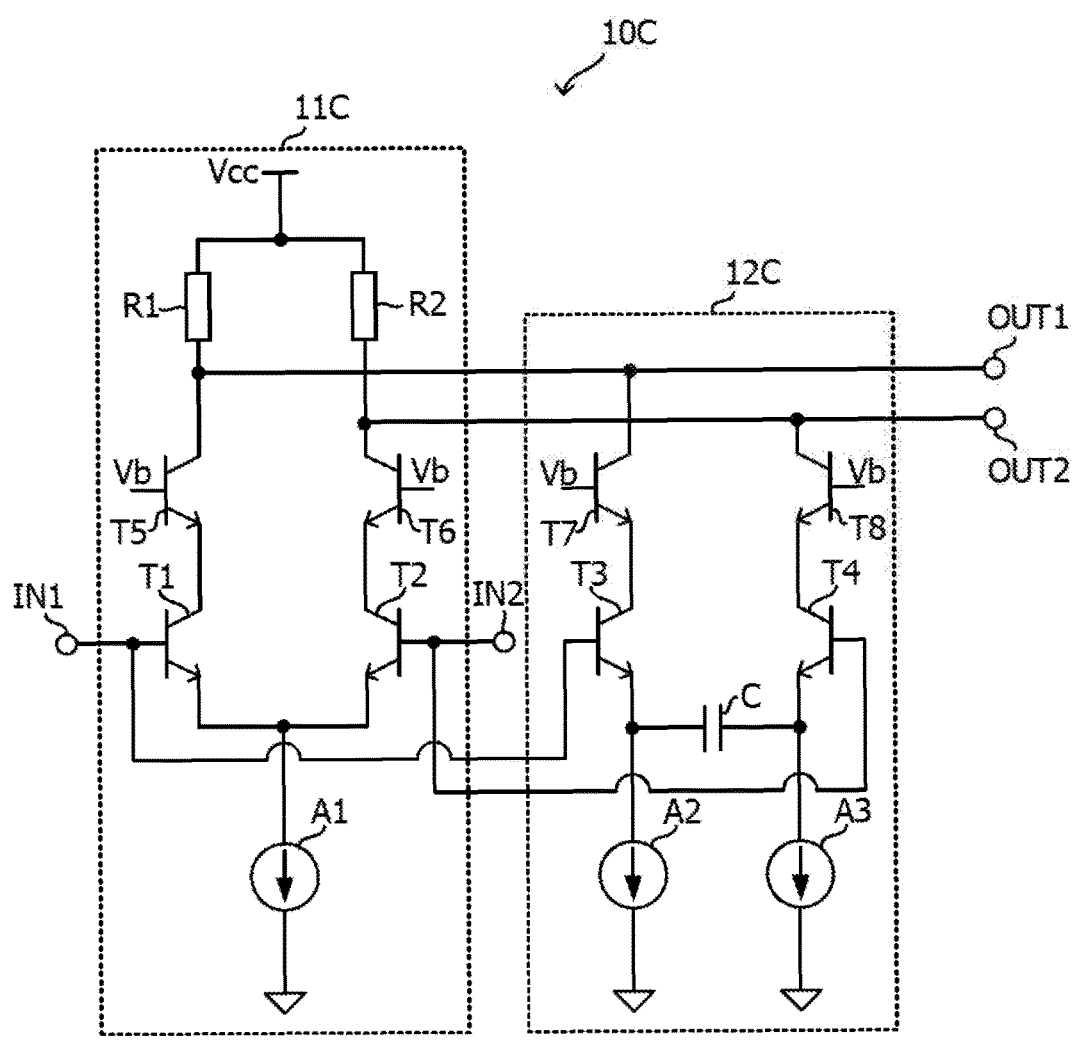
FIG. 18 illustrates an example of an equalizer circuit.

FIG. 18 illustrates an example of an equalizer circuit. The equalizer circuit 10C has a transistor T5 cascaded to the transistor T1 and a transistor T6 cascaded to the transistor T2, the transistors T5 and T6 being included in a differential amplification circuit 11C. The equalizer circuit 10C also has a transistor T7 cascaded to the transistor T3 and a transistor T8 cascaded to the transistor T4, the transistors T7 and T8 being included in a differential differentiation amplification circuit 12C. Except the transistors T5 to T8, the structure in FIG. 18 may be essentially the same as or similar to the structure of the equalizer circuit 10 illustrated in FIG. 7.

The bases of the transistors T5, T6, T7, and T8 are each biased with a bias voltage Vb, which has been adjusted to an optimum potential. Since the transistors T5 to T8, the base of which is biased, are respectively cascaded to the transistors T1 to T4 as described above, the high-speed characteristics of the differential amplification circuit 11C and differential differentiation amplification circuit 12C may be improved.

Transistors (in this example, transistors T5 and T6) may be added only to the differential amplification circuit 11C without transistors being added to the differential differentiation amplification circuit 12C. Conversely, transistors (in this example, transistors T7 and T8) may be added only to the differential differentiation amplification circuit 12C without transistors being added to the differential amplification circuit 11C. The variable capacitor Cx illustrated in FIG. 16 and the variable-resistance circuit Rx illustrated in FIG. 17 may be applied to the equalizer circuit 10C.

Figure 19:
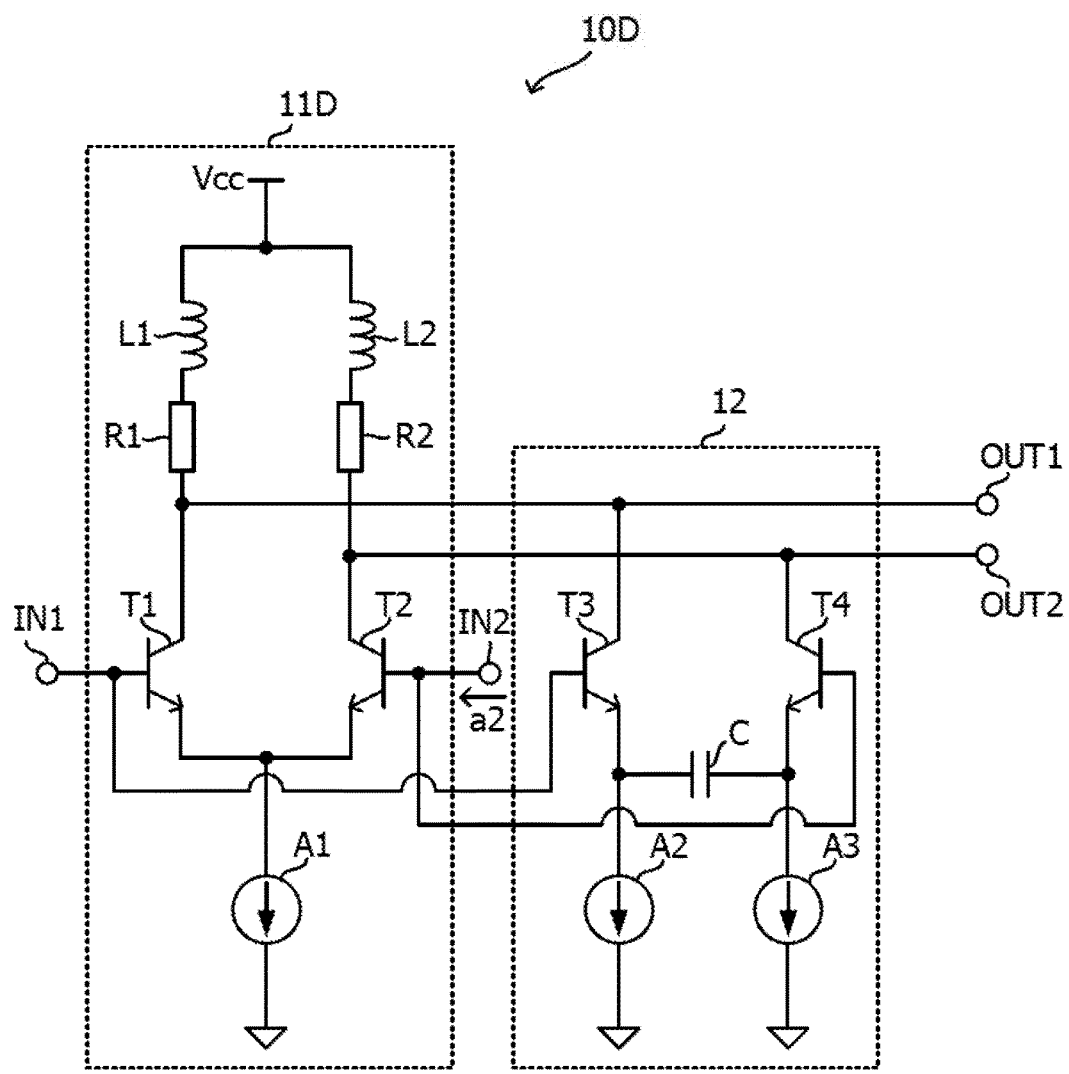
FIG. 19 illustrates an example of an equalizer circuit.

FIG. 19 illustrates an example of an equalizer circuit. The equalizer circuit 10D has an inductor L1 connected between the load resistor R1 and the power supply line Vcc and an inductor L2 connected between the load resistor R2 and the power supply line Vcc, the inductor L1 and inductor L2 being included in a differential amplification circuit 11D. Except the inductors L1 and L2, the structure in FIG. 19 may be essentially the same as or similar to the structure of the equalizer circuit 10 illustrated in FIG. 7.

In the equalizer circuit 10D, due to an advantageous effect of the inductors L1 and L2, the high-frequency component of the output signal may be further enhanced and adaptation to a signal at a higher frequency may be possible. Even if the inductors L1 and L2 are respectively connected directly to the differential output terminals OUT1 and OUT2, a similar effect may be obtained. The variable capacitor Cx illustrated in FIG. 16 and the variable-resistance circuit Rx illustrated in FIG. 17 may be applied to the equalizer circuit 10D. The transistors T5 to T8 illustrated in FIG. 18 may be applied to the equalizer circuit 10D. Although, in FIGS. 7, 16, 17, and 18, bipolar transistors are used as transistors included in the equalizer circuits, field-effect transistors such as metal-oxide-semiconductor field-effect transistor (MOSFETs) may be used.

Figure 20:
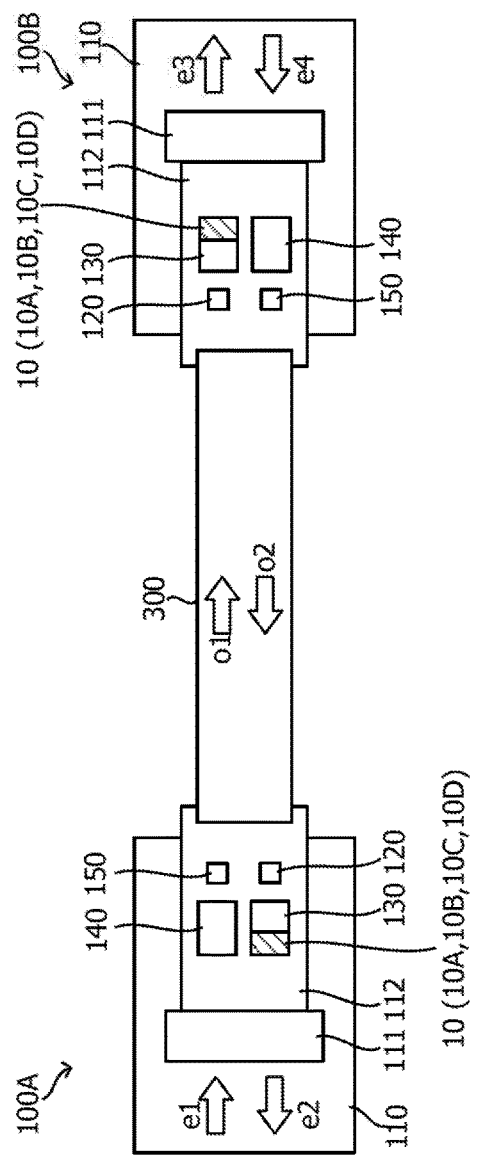
FIG. 20 illustrates examples of optical modules.

FIG. 20 illustrates examples of optical modules. The optical modules 100A and 100B, each of which includes the equalizer circuit 10 illustrated in FIG. 7, are interconnected through an optical fiber 300 so that they can mutually communicate. For example, the equalizer circuit 10 may be replaced with any one of the equalizer circuits 10A, 10B, 10C, and 10D respectively illustrated in FIGS. 16, 17, 18, and 19.

The structure of the optical module 100A will be described below. The optical module 100A has a printed circuit board 110, a connector 111 mounted on the printed circuit board 110, and a module board 112 connected to the connector 111. A photosensitive element 120, a transimpedance amplifier (TIA) 130, the equalizer circuit 10, a drive circuit 140, and a light emitting element 150 are mounted on the module board 112.

The drive circuit 140 receives an electric signal e1, which is input to the optical module 100A through a transmission line connected to the connector 111. The drive circuit 140 creates a drive signal according to the electric signal e1 and supplies the drive signal to the light emitting element 150. The light emitting element 150 creates an optical signal o1 according to the drive signal supplied from the drive circuit 140 and sends the optical signal o1 to the optical fiber 300. The optical signal o1 sent from the optical module 100A to the optical fiber 300 is received by the optical module 100B.

An optical signal o2 sent from the optical module 100B to the optical fiber 300 is received by the photosensitive element 120 in the optical module 100A. The photosensitive element 120 creates an optical current according to the light magnitude of the received optical signal o2 and supplies the optical current to the TIA 130. The TIA 130 converts the optical current supplied from the photosensitive element 120 to a voltage signal and supplies the voltage signal to the equalizer circuit 10. The equalizer circuit 10 performs waveform adjustment on the voltage signal supplied from the TIA 130 to enhance the high-frequency component of the voltage signal and outputs a signal obtained after the adjustment as an electric signal e2. The electric signal e2 is sent to the transmission line connected to the connector 111. Attenuation of the high-frequency component of the electric signal e2 is compensated for by waveform adjustment performed by the equalizer circuit 10.

The optical module 100B may be essentially similar to the optical module 100A; the optical module 100B creates an electric signal according to the optical signal o1 supplied through the optical fiber 300. The equalizer circuit 10 performs waveform adjustment on the electric signal and sends the resulting signal to the transmission line as an electric signal e3. The optical module 100B creates an optical signal o2 according to an electric signal e4 and transmits the optical signal o2 to the optical fiber 300.

The optical modules 100A and 100B may be used in optical communication between, for example, computer servers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An equalizer circuit comprising:
A pair of input terminals:
a differential amplification circuit outputs, to a pair of output terminals, first signals obtained by amplifying a difference in levels of input signals supplied to the pair of input terminals; and
a differential differentiation amplification circuit that outputs, to the pair of output terminals, second signals obtained by amplifying a time-varying change in the difference in the levels of the input signals supplied to the pair of input terminals.

2. The equalizer circuit according to claim 1, wherein:
the differential amplification circuit includes:
a first transistor;
a second transistor; and
a first current source,
wherein a base of the first transistor is coupled to one of the pair of input terminals;
a collector of the first transistor is coupled to one of the pair of output terminals;
a base of the second transistor is coupled to the other one of the pair of input terminals;
a collector of the second transistor is coupled to the other one of the pair of output terminals; and
an emitter of the first transistor and an emitter of the second transistor are coupled to the first current source.

3. The equalizer circuit according to claim 1, wherein:
the differential differentiation amplification circuit includes:
a third transistor;
a fourth transistor;
a second current source;
a third current source; and
a capacitive element,
wherein a base of the third transistor is coupled to one of the pair of input terminals;
a collector of the third transistor is coupled to one of the pair of output terminals;
a base of the fourth transistor is coupled to the other one of the pair of input terminals;
a collector of the fourth transistor is coupled to the other one of the pair of output terminals;
an emitter of the third transistor is coupled to the second current source;
an emitter of the fourth transistor is coupled to the third current source; and
the capacitive element is disposed between the emitter of the third transistor and the emitter of the fourth transistor.

4. The equalizer circuit according to claim 2, further comprising:
a first load resistor disposed between the collector of the first transistor and a power supply line; and
a second load resistor disposed between the collector of the second transistor and the power supply line.

5. The equalizer circuit according to claim 3, wherein the capacitive element is a variable capacitive element that has a variable capacitance.

6. The equalizer circuit according to claim 3, further comprising:
a variable-resistance circuit that is coupled in parallel to the capacitive element.

7. The equalizer circuit according to claim 2, further comprising:
a fifth transistor that is cascaded to the first transistor; and
a sixth transistor that is cascaded to the second transistor.

8. The equalizer circuit according to claim 3, further comprising:
a seventh transistor that is cascaded to the third transistor; and
an eighth transistor that is cascaded to the fourth transistor.

9. The equalizer circuit according to claim 4, further comprising:

a first inductor disposed between the power supply line and the first load resistor; and a second inductor disposed between the power supply line and the second load resistor.

10. An optical module comprising:

a photosensitive element that receives an optical signal and creates an optical current according to a light magnitude of the optical signal;

a conversion circuit that creates a voltage signal obtained by converting the optical current to a voltage; and an equalizer circuit to which the voltage signal is input as an input signal; wherein the equalizer circuit includes:

a pair of input terminals:

a differential amplification circuit outputs, to a pair of output terminals, first signals obtained by amplifying a difference in levels of input signals supplied to the pair of input terminals; and a differential differentiation amplification circuit that outputs, to the pair of output terminals, second signals obtained by amplifying a time-varying change in the difference in the levels of the input signals supplied to the pair of input terminals.

11. The optical module according to claim 10, wherein:

the differential amplification circuit includes:

a first transistor;

a second transistor; and a first current source, wherein a base of the first transistor is coupled to one of the pair of input terminals;

a collector of the first transistor is coupled to one of the pair of output terminals;

a base of the second transistor is coupled to the other one of the pair of input terminals;

a collector of the second transistor is coupled to the other one of the pair of output terminals; and an emitter of the first transistor and an emitter of the second transistor are coupled to the first current source.

12. The optical module according to claim 10, wherein:

the differential differentiation amplification circuit includes:

a third transistor;

a fourth transistor;

a second current source;

a third current source; and a capacitive element, wherein a base of the third transistor is coupled to one of the pair of input terminals;

a collector of the third transistor is coupled to one of the pair of output terminals;

a base of the fourth transistor is coupled to the other one of the pair of input terminals;

a collector of the fourth transistor is coupled to the other one of the pair of output terminals;

an emitter of the third transistor is coupled to the second current source;

an emitter of the fourth transistor is coupled to the third current source; and the capacitive element is disposed between the emitter of the third transistor and the emitter of the fourth transistor.

13. The optical module according to claim 11, further comprising:

a first load resistor disposed between the collector of the first transistor and a power supply line; and a second load resistor disposed between the collector of the second transistor and the power supply line.

14. The optical module according to claim 12, wherein the capacitive element is a variable capacitive element that has a variable capacitance.

15. The optical module according to claim 12, further comprising:

a variable-resistance circuit that is coupled in parallel to the capacitive element.

16. The optical module according to claim 11, further comprising:

a fifth transistor that is cascaded to the first transistor; and a sixth transistor that is cascaded to the second transistor.

17. The optical module according to claim 12, further comprising:

a seventh transistor that is cascaded to the third transistor; and an eighth transistor that is cascaded to the fourth transistor.

18. The optical module according to claim 13, further comprising:

a first inductor disposed between the power supply line and the first load resistor; and a second inductor disposed between the power supply line and the second load resistor.

* * * * *